United States Patent
Slanina

(10) Patent No.: US 11,044,688 B2
(45) Date of Patent: Jun. 22, 2021

(54) POSITION-ADAPTIVE COMMUNICATION METHOD

(71) Applicant: Atos IT Solutions and Services GmbH, Vienna (AT)

(72) Inventor: Peter Slanina, Judenau (AT)

(73) Assignee: Atos IT Solutions and Services GmbH, Vienna (AT)

( * ) Notice: Subject to any disclaimer, the term of this patent is extended or adjusted under 35 U.S.C. 154(b) by 58 days.

(21) Appl. No.: 16/494,053

(22) PCT Filed: Mar. 8, 2018

(86) PCT No.: PCT/EP2018/055785
§ 371 (c)(1),
(2) Date: Sep. 13, 2019

(87) PCT Pub. No.: WO2018/166890
PCT Pub. Date: Sep. 20, 2018

(65) Prior Publication Data
US 2021/0127344 A1    Apr. 29, 2021

(30) Foreign Application Priority Data
Mar. 15, 2017 (EP) ..................... 17161030

(51) Int. Cl.
*H04W 24/00* (2009.01)
*H04W 56/00* (2009.01)
(Continued)

(52) U.S. Cl.
CPC ........... *H04W 56/006* (2013.01); *G01S 11/02* (2013.01); *H04L 69/28* (2013.01); *H04W 64/003* (2013.01)

(58) Field of Classification Search
CPC ... H04W 56/006; H04W 64/003; G01S 11/02; H04L 69/28
(Continued)

(56) References Cited

U.S. PATENT DOCUMENTS 7,024,190 B1 * 4/2006 Raust ................. H04B 7/18532
370/316
7,596,113 B1    9/2009 Kingston et al.
(Continued)

FOREIGN PATENT DOCUMENTS

WO    2013/063789 A1    5/2013

OTHER PUBLICATIONS

Hyungjun Jang, et al., "Location-Based TDMA MAC for Reliable Aeronautical Communications", IEEE Transactions on Aerospace and Electronic Systems, Apr. 1, 2012, pp. 1848-1854, vol. 48, No. 2.
(Continued)

*Primary Examiner* — Danh C Le
(74) *Attorney, Agent, or Firm* — Sughrue Mion, PLLC

(57) ABSTRACT

The invention relates to a position-adaptive communication method which is carried out by a communication control module of a movable vehicle (1) in order to establish and maintain a communication connection (4) between the vehicle (1) and an opposite station (3). The communication method is a packet-based communication method, and a transmission pause (13) is provided between data packets and/or within the data packets. Position data of the vehicle (1) relative to a global coordinate system is ascertained, and a movement data set is received from at least one opposite station by means of a receiving device. Position data is extracted from the received movement data, and the position of the opposite station in the global coordinate system is determined. A directional vector (8) from the vehicle (1) to
(Continued)

the opposite station (6) is ascertained, and a signal propagation time is ascertained from the length of the directional vector (8). The transmission path (13) is then adaptively matched to the ascertained signal propagation time by a timer of the communication control module.

18 Claims, 2 Drawing Sheets

(51) Int. Cl.
*H04W 64/00* (2009.01)
*G01S 11/02* (2010.01)
*H04L 29/06* (2006.01)

(58) Field of Classification Search
USPC .................. 455/456.1, 456.5, 456.6, 418
See application file for complete search history.

(56) References Cited

U.S. PATENT DOCUMENTS

| | | | |
|---|---|---|---|
| 10,551,491 B2 * | 2/2020 | Rubel | G01S 13/26 |
| 2013/0324154 A1 * | 12/2013 | Raghupathy | G01S 5/0236 |
| | | | 455/456.1 |
| 2014/0331272 A1 * | 11/2014 | Gupta | H04L 63/20 |
| | | | 726/1 |
| 2015/0346332 A1 * | 12/2015 | Taylor, Jr. | G01S 13/84 |
| | | | 342/458 |
| 2015/0346349 A1 * | 12/2015 | Taylor, Jr. | G01S 5/0263 |
| | | | 342/357.24 |
| 2015/0350946 A1 * | 12/2015 | Das | H04W 4/80 |
| | | | 455/41.2 |
| 2016/0255603 A1 * | 9/2016 | Venkatraman | G01R 29/10 |
| | | | 455/456.1 |
| 2017/0150475 A1 * | 5/2017 | Li | H04W 76/23 |
| 2018/0288730 A1 * | 10/2018 | Kuchler | H04W 12/033 |
| 2019/0263358 A1 * | 8/2019 | Kusumoto | H04W 4/021 |

OTHER PUBLICATIONS

Ho Dac Tu, et al., "A Proposal of Relaying Data in Aeronautical Communication for Oceanic Flight Routes Employing Mobile Ad-Hoc Network", 2009, First Asian Conference on Intelligent Information and Database Systems, Apr. 1, 2009, pp. 436-441.

International Search Report for PCT/EP2018/055785, dated May 9, 2018 [PCT/ISA/210].

* cited by examiner

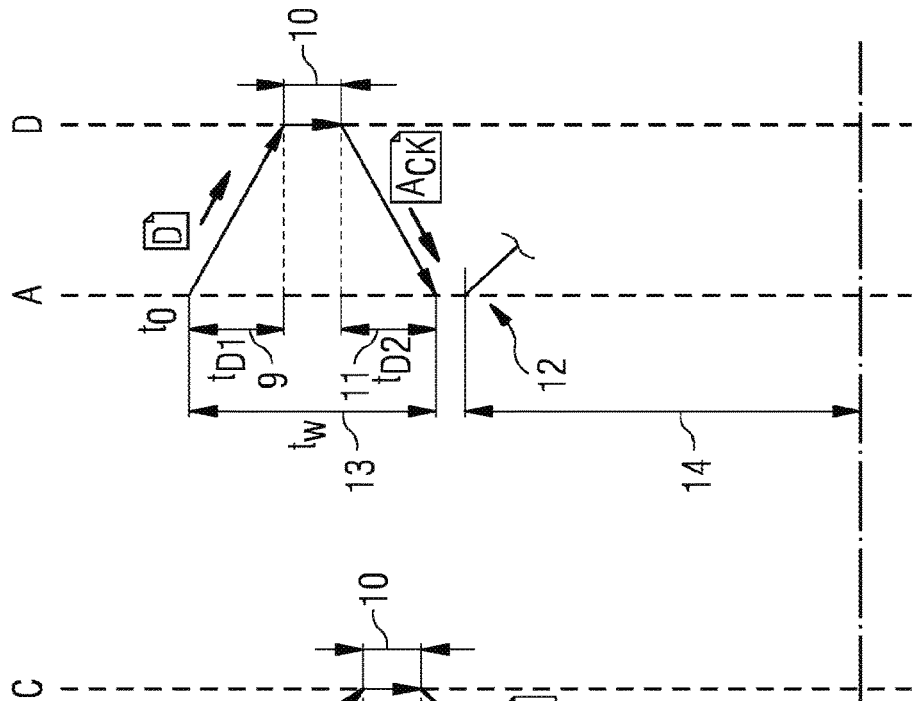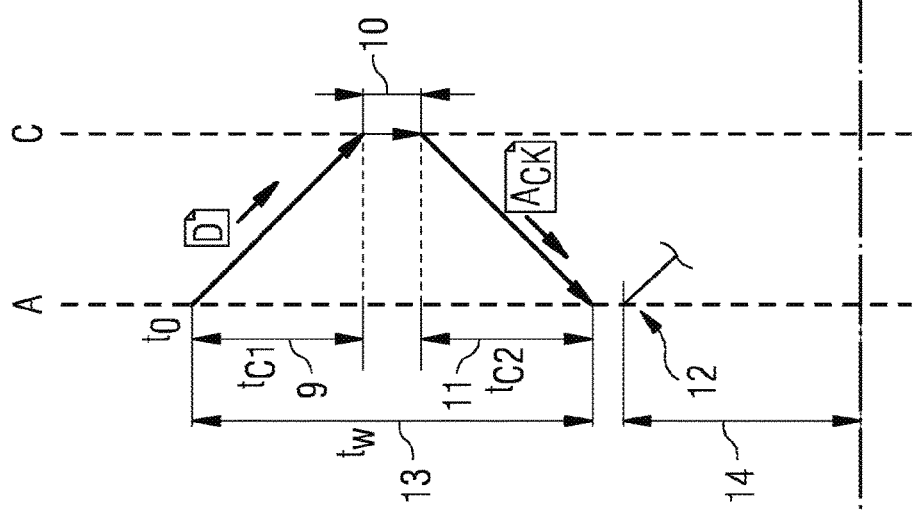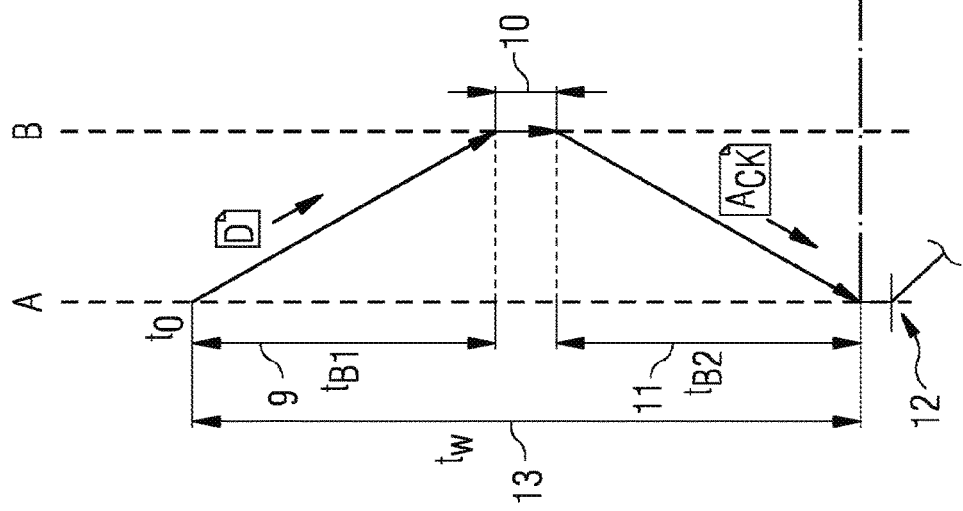

POSITION-ADAPTIVE COMMUNICATION METHOD

CROSS REFERENCE TO RELATED APPLICATIONS

This application is a National Stage of International Application No. PCT/EP2018/055785, filed Mar. 8, 2018, which claims priority to European Patent Application No. 17161030.6, filed Mar. 15, 2017.

The invention relates to a position-adaptive communication method.

In a mobile, non-directional communication, the problem always arises that every station can essentially be a transmitter and receiver of the communication message. Unless the sequence in which the individual stations can transmit is defined, it can always occur that two or more stations start to transmit simultaneously. However, this inevitably causes a collision of the transmitted messages and therefore a total loss in both transmitting stations. As a result of this circumstance, waiting pauses have been inserted into communication protocols, particularly into communication protocols for a packet-oriented message transmission. It is provided here, following the transmission of a message, that a fixed time must be waited before a further transmission attempt can take place. To prevent all transmitting stations present in the group from starting to transmit simultaneously when the waiting pause elapses, it is provided that this waiting pause contains a random component so that the probability of two stations starting to transmit simultaneously is low. The basic duration of the waiting pause is defined by the maximum possible communication distance. The waiting pause corresponds, for example, to twice the maximum signal propagation time between the transmitter and receiver. It is thus guaranteed that collision-free communication is possible between two stations which are located at the maximum coverable distance from one another.

The disadvantage of this approach, however, is that the communication pause is designed for the maximum possible communication distance which can only be applied conditionally in real practice. Communication connections are often set up between stations which are located at a significantly shorter distance from one another, so that the inserted waiting pause is too long and valuable transmission capacity is thereby wasted.

It would then be possible to design a communication protocol specifically adapted to this situation, but this would have the disadvantage that standardized and available communication means would not usually support a communication protocol of this type.

The object of the invention is therefore to improve an existing communication system or communication method and/or communication protocol so that a maximum transmission capacity adapted to the communication situation is achieved.

The object of the invention is achieved by a position-adaptive communication method, carried out by a communication control module of a mobile vehicle. The method serves to set up and maintain a communication connection between a communication interface of a mobile vehicle, in particular a waterborne vessel and/or aircraft, and a communication interface of a remote station. The communication method is a packet-based communication method with a communication protocol which transmits useful data, backup data and possibly signaling data, etc. as data packets in a sequence in a communication frame, and wherein a transmission pause is provided between data packets and/or within the data packets. The method comprises the following steps:

determining position data of the vehicle with reference to a global coordinate system;

receiving a movement data set from at least one remote station by means of a receiving device;

extracting position data from the received movement data and defining the position of the remote station in the global coordinate system;

determining a direction vector from the vehicle to the remote station;

determining a signal propagation time from the length of the direction vector;

adaptive matching of the transmission pause to the determined signal propagation time by a timer of the communication control module.

The coordinate system is designed in such a way that it relates to the same reference point for the vehicle and the remote station. This may, for example, be a satellite-based navigation system. However, it may also be a local, proprietary coordinate system which has been defined by the operator of a communication system which uses the present method.

A remote station is essentially understood herein to mean a base station of a cellular communication network. Participants, in particular the present mobile vehicle, can set up a communication connection to the base station, as the remote station, within a definable area around the base station. The terms remote station and base station are used synonymously below. With regard to meshed networks, this term is also understood to mean a different node in the network.

The distance between the vehicle and the remote station is relevant in determining the signal propagation time. In this respect, the direction vector is to be understood as a vector from the starting point to the destination point, the length of the direction vector thus corresponding to the vector amount. Information relating to a direction of the vector is not relevant to the present method, although a vector may always contain direction information also, particularly as the position data of the vehicle and the position data of the remote station extracted from the transmitted movement data may contain a reference to an absolute direction.

A communication frame is understood herein to mean a defined structure or a defined sequence of elements of the communication protocol that is used. Since details of the frame structure are not the subject-matter of this invention, the person skilled in the art is referred to relevant literature relating to WiMAX and LTE (in TDD and FDD).

A transmission pause is essentially understood herein to mean a time in which no transmission is allowed to take place. In the case of Wi-Fi meshed networks, a pause must be present before and after a data packet, since the CSMA/CA transmission protocol would otherwise cause a collision. The individual communication interfaces are not allowed to transmit here for the maximum propagation time. In the case of WiMAX and LTE in TDD (time division duplex) mode, a pause is provided in each case before a change of transmission direction. The length of the pause is similarly defined by the maximum propagation time. In TDD mode in the case of LTE and WiMAX, the direction of transmission changes twice per communication frame. Transmission pauses are inserted in both cases to compensate the maximum radio propagation time.

In the case of LTE and WiMAX in FDD mode, the base stations (eNB evolved NodeB) and the communication interface of the vehicle (or other communication participants) transmit on different frequencies. Since the signals of the vehicle must fit into the timeslot provided, transmission pauses are also necessary in the case of FDD during the initial access. These transmission pauses are defined with the present advantageous position-adaptive communication method.

According to one development, in the case of a transmission pause provided by the communication protocol which is shorter than the determined signal propagation time, it is provided that the transmission pause is made equal at least to the determined signal propagation time. Without this development, it can and will occur that the vehicle retransmits data packets before a possible response from the remote station can reach the transmitting station due to the distance. This results in a collision and loss of the transmitted data packet. With this design, it is guaranteed that the vehicle transmits at the earliest when a response from the remote station should have arrived.

It should be noted that the transmitting/receiving vehicle or remote station is mentioned below. Technically speaking, this is understood to mean that a communication device transmits or receives a signal or data packet in each case via the communication interface. The terms transmitter and receiver are also to be understood as having the same meaning. The term signal propagation time or simply propagation time is furthermore not to be understood in a restrictive sense as describing the timespan from the transmitter to the receiver. In particular, the propagation time is also understood to mean the entire time span of an individual communication cycle, in the sense of an RTT (round trip time).

In one development, in the case of a transmission pause provided by the communication protocol which is longer than the determined signal propagation time, the transmission pause is made equal at least to the determined signal propagation time. This development guarantees that a transmission pause does not last unnecessarily long if it is possible to retransmit significantly earlier due to e.g. a short distance. A communication protocol is usually designed in such a way that it is in any event possible to communicate with a remote station which is located at the maximum technically possible distance. The maximum distance is derived from the parameters of the communication medium used by the communication interface and is essentially defined by the propagation loss. If the remote station is located close to the vehicle, substantial possible transmission capacity is wasted by selecting the transmission pauses as substantially too long. It should be noted that the transmission pause is shortened only insofar as all possible communication partners wishing to use the present communication method can in any event also do so. This development also applies to the case where a plurality of stations are present in a communication network, in particular for all remote stations in the subnetwork (e.g. all mobile stations which are connected to a base station), or all Wi-Fi stations which form a local network on one frequency.

In one development, the position data of the vehicle are extracted from data packets which have been received from a global satellite navigation system by means of a receiver provided on the vehicle. Many vehicles have a device for receiving satellite navigation signals and for extracting position data from the received signal packets. These position data can then be used advantageously in determining the direction vector to define the position of a driver's own vehicle. The present method can advantageously access existing systems and no additional complex and costly installation is required.

In one development, movement data are transmitted cyclically by an automated identification system of the vehicle and/or of the remote station and are received by a receiving device of the vehicle. In accordance with international conventions on safety of life at sea (SOLAS), every large ship must have an automatic identification system (AIS) on board. In this system, the movement data comprise the position (LAT, LON), course (COG), speed (SOG), time (UTC) and course direction (heading). An equivalent exists in aviation with the ADS-B. This development offers the advantage that the present method can access identification data which have a high accuracy due to their safety-related importance and, above all, are always kept up-to-date. Depending on the applicable safety class, the update rate in the case of AIS ranges from 2 seconds to 3 minutes.

In one development, an identifier is extracted from the received movement data and is stored as a vehicle identifier or remote station identifier in a database of the communication control module. According to international regulations, every vehicle (marine vessel or aircraft) carries a unique identifier, for example a vehicle name and/or registration number. In one development, the currently received movement data are additionally stored in the database. As a result, it becomes possible to match the communication protocol (the transmission pause) and set up a communication connection to a specific remote station without a previous exchange of communication parameters or exchange of identifiers, since the required parameters can be read from the database. The present identifier can, however, also be formed by an identifier of the communication network or the transmitting device, so that only those transmitting devices which have the corresponding identifier can connect to the communication network. It is in any event important that no identifier needs to be transmitted via the communication connection, since said identifiers are stored.

For a company or organization, it is usually only important that a reliable communication connection exists between its own vehicles. It is therefore provided according to one development that a group identifier is assigned to a selection of stored remote station identifiers and is stored. With this development, those remote stations which belong, e.g. to the vehicle fleet of a company, can be combined or marked.

According to one development, it is provided that the matching of the transmission pause is carried out only in the case of remote stations for which a group identifier is stored in the database. With this development, the number of remote stations to be considered can be significantly reduced, since remote stations with an identifier for which no group identifier is stored are ignored. In particular, it can be assumed that remote stations without a group identifier do not support the present method and that communication errors will occur if the transmission pause is matched.

Along with a communication with mobile remote stations, it can be provided that a communication is intended to be set up with stationary base stations also. However, stationary base stations do not necessarily need to have an automated identification system. In one development, position data of at least one stationary remote station are therefore stored in the database. If a communication connection is to be set up to a base station, the direction vector can be determined directly due to the knowledge of the position of the base station.

In one development, movement data of a plurality of remote stations are received and a direction vector is determined for each of these remote stations. If communication is intended to take place with a plurality of remote stations, it is advantageous if the propagation time is known for each remote station by means of the direction vector. The optimum transmission pause can thus be used for each communication path.

One development according to which the signal propagation time is determined as the maximum of the lengths of the direction vectors is similarly advantageous. If a communication connection is intended to be maintained simultaneously with a plurality of remote stations, the transmission pause must be matched to the most distant remote station so that the latter can also reliably maintain the communication connection. Depending on the communication protocol that is used, the maximum of the lengths of the direction vectors is understood, in the case of LTE/WiMAX, to mean the maximum of the distances from all mobile stations to the base station and, in the case of Wi-Fi networks, the maximum of the distances between all stations in the network.

If the vehicle and/or the remote station moves, the direction vector will most probably change and the current propagation time will therefore also differ from the determined propagation time. It is therefore provided according to one development that the timer cyclically carries out the matching of the transmission pause. The cycle time will depend on the expected maximum speed of movement of the communication partners.

One development according to which the timer forms the transmission pause from the propagation time signal and a safety timespan is furthermore advantageous. If the transmission pause corresponds exactly to the propagation time signal, a transmission collision may nevertheless occur due to slight temporal fluctuations. A vehicle may move slightly, for example, and slight fluctuations in the propagation parameters may also occur on the communication path or on the communication medium. The present development guarantees that the transmission pause is long enough so that even minor fluctuations of this type do not result in any interference in the transmission without the transmission pause as such having to be matched.

In one advantageous development, a cell plan comprising coordinates of the coverage area is also stored in the communication control module and the determined position data of the vehicle are compared by the communication control module with the stored coordinates of the coverage area and the communication interface of the vehicle is deactivated if a vehicle position lies outside the coverage area. The coverage area around the base station depends quite substantially on the technical design of the communication interface of the base station, in particular on the design of the antennas. This coverage area is determinable in advance by means of numerical methods and can thus be stored in every vehicle. With this development, it is possible for the communication control module to check at all times whether the vehicle is still located in the coverage area. In order to prevent interference affecting other communication participants, the communication interface, in particular the radio unit, can be deactivated on leaving the coverage area. This design furthermore offers the advantage that it can be decided by the communication control module without an active communication connection to the remote station whether the vehicle is located within permitted coordinates and a communication connection set-up is allowed.

As an alternative to storage in advance, it is furthermore also possible for a cell plan to be transmitted from the remote station via the communication connection to the vehicle and to be stored there by the communication control module. This design offers the advantage that the communication control module always has up-to-date data available relating to the respective coverage area. In particular, a configuration of the vehicle in situ is not required, since the cell plan can be calculated centrally and can be transmitted directly to the vehicle via a data communication path.

In one development, the communication control module sets up a data connection via the communication connection to a processing service and transmits the position data of the vehicle and the remote station to the processing service and receives the signal propagation time and/or an updated communication protocol. With a view to the highest possible flexibility, this development offers the advantage that only the basic functionality of the present method needs to be present in situ, the parameters required for the current situation being determined from a central location, for example from a cloud service.

The object of the invention is also achieved by a communication protocol for use in a communication method of the present type. The communication protocol is executed by a communication control module and defines that useful data, signaling data, backup data, etc. are transmitted in a temporally defined sequence, wherein a transmission pause is provided between data packets and/or within the data packets. To do this, the communication control module has a timer which is designed to influence the transmission pause and has a signal input at which a propagation time signal which serves as a basis for exerting the influence is present.

According to one development, the communication protocol is formed as one of the protocols of the CSMA/CA, WiMAX and LTE group, and also WiMAX and LTE in TDD or FTD mode. These protocols are optimized in terms of their immunity to interference with a simultaneously high transmission capacity.

FIG. 2a to FIG. 2c show a time diagram of the transmission of a message packet to remote stations located at different distances.

Figure 1:
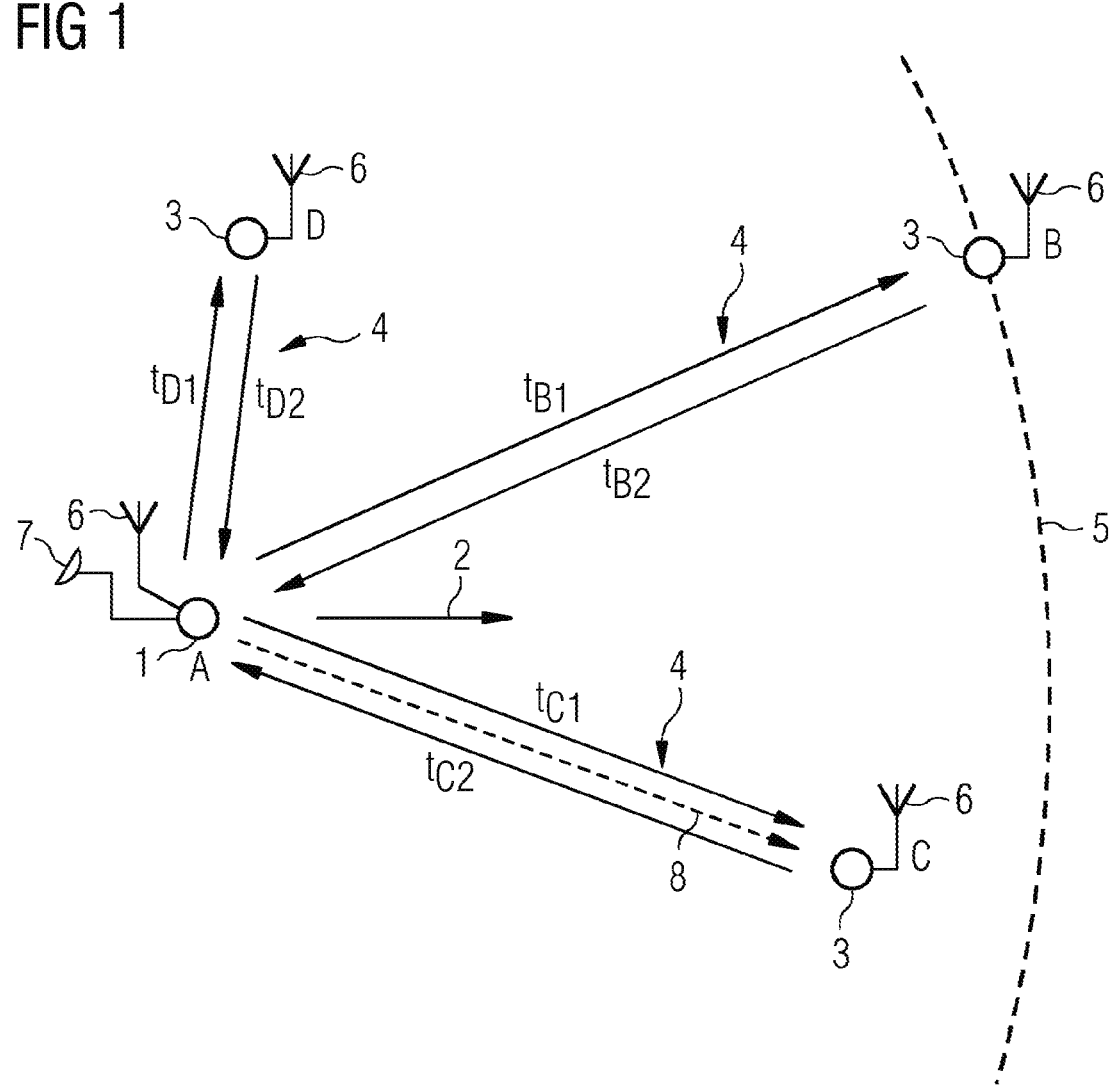
FIG. 1 shows a schematic representation of the communication situation between a vehicle and a plurality of remote stations.

FIG. 1 shows a real communication situation between a plurality of communication stations. One of the communication stations, a vehicle 1, moves along a direction of movement 2 between the other stations 3, wherein a communication connection 4 can exist between the vehicle 1 and the remote stations 3 B, C, D. It is agreed that the communication connection 4 is a wireless communication connection, in particular a radio-based communication connection. A data-packet-based communication protocol is furthermore executed via the communication connection 4, said protocol being characterized, in simplified terms, in that a data packet (useful data, control data, synchronization, etc.) is transmitted by the transmitter, and the reception must be acknowledged by the receiver. A data packet can be dispatched by the same or by a different transmitter only after this acknowledgement message. The transmitter must therefore always wait the maximum possible propagation time before a further transmission procedure can be started. The maximum possible signal propagation time is then essentially derived from twice the propagation time of a data packet from the transmitter to the most distant receiver which is still reachable with the technical parameters of the communication connection.

FIG. 1 can equally be understood to involve a TDD mode in which a transmission takes place from the transmitter A to the receiver B during a first time and then, after a switchover time, a transmission takes place from the station B, now as the transmitter, to the receiver A. The description below is based on an acknowledged transmission.

A communication connection between a vehicle and a remote station is discussed below, wherein it should be noted that the communication connection exists between a communication interface of the vehicle and a communication interface of the remote station.

Starting from the vehicle 1 as the communication station A, a communication area, essentially corresponding to a communication radius 5 with the vehicle 1 at the center, is defined according to the radio technology characteristics of the communication connection 4. The remote station B is thus the station furthest away from the vehicle 1 to which a communication connection 4 can be set up. A communication packet transmitted from the vehicle 1 requires the time tB1 to reach the remote station B. The packet is checked by the remote station B and an acknowledgement of receipt is sent back to the transmitting vehicle 1. This acknowledgement now requires the time tB2 until it can be received by the vehicle 1.

Along with the most distant remote stations B or distant remote stations C, a communication can also take place from the vehicle 1 with a remote station D. It is clearly evident that the signal propagation time tD1 to the remote station D and back tD2 is significantly less than in the case, for example, of a more distant remote station C. Due to the specifications in the communication protocol, the vehicle 1 would wait the maximum specified transmission pause before a new data packet is dispatched.

With the present advantageous position-adaptive communication method, it is now possible to improve the transmission capacity significantly by matching the transmission pause to the distance to the remote station.

In international seafaring and aviation, it is a mandatory requirement for every vehicle or every remote station to have an automatic identification system 6 which transmits characteristic movement data of the vehicle or the remote station. These transmitted movement data can be received and evaluated by all vehicles and stations. The vehicle 1 thus knows at all times the position(s) where remote stations are located with reference to a global coordinate system. The vehicle can similarly be equipped with an automated identification system to define its own position, but it is also possible that the position of the vehicle 1 can be defined with reference to a global coordinate system by means of a satellite-based navigation system. The vehicle 1 has a receiving device 7 for a global satellite navigation system for this purpose.

A direction vector 8 from the vehicle 1 to the remote station 3 can be determined from the knowledge of the position of the vehicle 1 itself and the knowledge of the position of the remote station 3. The signal propagation time from the vehicle to the remote station can be determined from the length of this direction vector 8 and the technical propagation parameters of the communication medium from the vehicle 1 to the remote station 3. This is possible, in particular, without a communication connection 4 having to exist for this purpose or without any type of communication or synchronization needing to have taken place between the vehicle 1 and the remote station 3 for this purpose.

FIG. 2*a* to FIG. 2*c* show signal propagation diagrams in the communication of the vehicle with different remote stations.

FIG. 2*a* shows the propagation time diagram in the communication with a remote station B at the maximum communication radius 5. The transmission of a single data packet, regardless of the type, is in each case shown here. It is furthermore assumed that the communication connection exists between the vehicle A and the respective remote station (B, C, D).

A message packet is transmitted at a time t0 from the vehicle A via the communication interface and moves on the communication path from the vehicle A to the remote station B. The propagation speed is derived from the technical characteristics of the communication path. The message packet reaches the remote station B after a first propagation time tB1 9. The message packet is received and processed there, and, as provided in packet-based message transmission, the reception of the packet is acknowledged by transmitting back an acknowledgement message. The reception, processing and generation of the acknowledgement response requires some processing time 10 at the remote station B, wherein this processing time 10 is shown as substantially enlarged in FIG. 2*a* to FIG. 2*c*.

After the second propagation time tB2 11, the acknowledgement message reaches the vehicle 1, as a result of which a transmission cycle is completed. After a short processing time, the vehicle could thus dispatch the next message packet in the direction of the remote station B at the next transmission time 12. The transmission pause tW 13 before the transmitting station can dispatch the next message packet to the remote station is therefore derived from the sum of the first 9 and second 11 propagation time and the processing time 10.

FIG. 2*b* shows a communication with a remote station C disposed closer to the vehicle A. The essential procedure is identical to the situation shown in FIG. 2*a*. A message packet is dispatched at a time t0 from the vehicle A in the direction of the remote station C and reaches the latter after the first propagation time 9 tC1. After the processing time 10 at the remote station C, an acknowledgement message is transmitted back to the vehicle and reaches the latter after the second propagation time 11 tC2.

Due to the shorter distance between the vehicle A and the remote station C, the acknowledgement message is present significantly earlier at the transmitting vehicle A than in the case of a communication with the remote station B located at the maximum distance (FIG. 2*a*). Without the advantageous design of the present position-adaptive communication method, the maximum transmission pause would have to be waited in the case 2*b* also. An unnecessary waiting time 14 in which the transmission capacity of the communication connection is not used would therefore be introduced by the communication interface of the vehicle A. With the present method, however, the position of the remote station C is known and the maximum propagation time to be expected can therefore be defined via the determined direction vector from the vehicle A to the remote station C and the transmission pause 13 can therefore be corrected to a lower value. The next transmission time 12 is therefore moved forward so that the waiting time 14 to be introduced without the present advantageous method can now be regarded as a transmission capacity gain.

FIG. 2*c* shows the situation between the vehicle A and a remote station D which is located only a short distance from the vehicle A. The basic procedure corresponds to the procedure already described above. A message packet is sent at a time t0 from a vehicle A to the remote station D and reaches the latter after the first propagation time 9 tD1. After the processing time 10 at the remote station D, an acknowledgement message is sent back to the vehicle A and reaches the latter after the second propagation time 11 tD2. The transmission capacity gain can be regarded here as particularly significant, since the transmission pause 13 can be reduced significantly due to the knowledge of the distance. In the case shown, said transmission pause is less than the first propagation time 9 in the communication of the vehicle A with the remote station B located at the furthest possible distance (FIG. 2*a*). In the case 2*c* also, the communication interface at the vehicle A would have to wait the entire maximum transmission pause without the present advantageous method, resulting in the situation in which the waiting time 14 would be longer than a single communication procedure.

It is again expressly noted that the transmission pause can be reduced only insofar as all stations present in the communication network can in any event use the present method. If a communication takes place between the stations A and C from FIG. 1 and if, for example, the station B leaves the communication radius 5, the transmission pause is defined by the distance to the vehicle C which is now the most distant vehicle.

The communication connection can be significantly more effectively utilized with the present method, since the transmission pauses 13 can be shortened to the minimum extent required for this communication situation or distance due to the knowledge of the distance to the remote station or the distances to the remote stations. A waiting time 14 to satisfy the protocol-prescribed maximum parameters is therefore eliminated.

The transmission pause for each communication connection can be individually matched with the present method due to the knowledge of the position of the remote stations, so that the maximum possible transmission capacity is achieved for each communication connection by avoiding waiting pauses for complying with a rigid protocol framework.

The invention claimed is:

1. A position-adaptive communication method,
   carried out by a communication control module of a mobile vehicle to set up and maintain a communication connection between a communication interface of a mobile vehicle, in particular a waterborne vessel and/or aircraft, and a communication interface of a remote station,
   wherein the communication method is a packet-based communication method with a communication protocol which transmits useful data, backup data and possibly signaling data, et cetera as a data packet in a sequence in a communication frame, and wherein a transmission pause is provided between data packets and/or within the data packets, comprising the following steps:
   determining position data of the vehicle with reference to a coordinate system;
   receiving a movement data set from at least one remote station by means of a receiving device;
   extracting position data from the received movement data and defining the position of the remote station in the global coordinate system;
   determining a direction vector from the vehicle to the remote station;
   determining a signal propagation time from the length of the direction vector;
   adaptive matching of the transmission pause to the determined signal propagation time by a timer of the communication control module.

2. The communication method as claimed in claim 1, characterized in that, in the case of a transmission pause provided by the communication protocol which is shorter than the determined signal propagation time, the transmission pause is made equal at least to the determined signal propagation time.

3. The communication method as claimed in claim 1, characterized in that, in the case of a transmission pause provided by the communication protocol which is longer than the determined signal propagation time, the transmission pause is made equal at least to the determined signal propagation time.

4. The communication method as claimed in claim 1, characterized in that the position data of the vehicle are extracted from data packets which have been received from a global satellite navigation system by means of a receiver provided on the vehicle.

5. The communication method as claimed in claim 1, characterized in that movement data are transmitted cyclically by an automated identification system of the vehicle and/or of the remote station and are received by a receiving device of the vehicle.

6. The communication method as claimed in claim 1, characterized in that an identifier is extracted from the received movement data and is stored as a remote station identifier in a database of the communication control module.

7. The communication method as claimed in claim 6, characterized in that a group identifier is assigned to a selection of stored remote station identifiers and is stored.

8. The communication method as claimed in claim 6, characterized in that the matching of the transmission pause (13) is carried out only in the case of remote stations for which a group identifier is stored in the database.

9. The communication method as claimed in claim 1, characterized in that position data of at least one stationary remote station are stored in the database.

10. The communication method as claimed in claim 1, characterized in that movement data of a plurality of remote stations are received and a direction vector is determined for each of these remote stations.

11. The communication method as claimed in claim 10, characterized in that the signal propagation time is determined as the maximum of the lengths of the direction vectors.

12. The communication method as claimed in claim 1, characterized in that the timer cyclically carries out the matching of the transmission pause.

13. The communication method as claimed in claim 1, characterized in that the timer forms the transmission pause from the signal propagation time and a safety timespan.

14. The communication method as claimed in claim 1, characterized in that a cell plan comprising coordinates of the coverage area is stored in the communication control module and the determined position data of the vehicle are compared by the communication control module with the stored coordinates of the coverage area and, if a vehicle position lies outside the coverage area, the communication interface of the vehicle is deactivated.

15. The communication method as claimed in claim 14, characterized in that a cell plan is transmitted from the remote station via the communication connection to the vehicle and is stored by the communication control module.

16. The communication method as claimed in claim 1, characterized in that the communication control module sets up a data connection via the communication connection to a processing service and transmits the position data of the vehicle and the remote station to the processing service and receives the signal propagation time and/or an updated communication protocol.

17. A communication protocol for use in a communication method as claimed in claim 1, comprising, in a temporally defined sequence, useful data, signaling data, backup data, et cetera, and wherein a transmission pause is provided between data packets and/or within the data packets, said communication protocol being executed by a communication control module, characterized in that the communication control module has a timer which is designed to influence the transmission pause said timer having a signal input at which a propagation time signal is present, said propagation time signal serving as a basis for exerting the influence.

18. The communication protocol as claimed in claim 17, characterized in that the communication protocol is formed as one of the protocols of the CSMA/CA, WiMAX and LTE group.

\* \* \* \* \*